United States Patent [19]

Sakaguchi et al.

[11] 4,065,435
[45] Dec. 27, 1977

[54] WATER-SOLUBLE POLYMERS AND PROCESS FOR PRODUCING THE SAME

[75] Inventors: Shinji Sakaguchi; Shinichi Imai; Junn Yamaguchi; Nobuo Tsuji, all of Minami-ashigara, Japan

[73] Assignee: Fuji Photo Film Co., Ltd., Minami-ashigara, Japan

[21] Appl. No.: 694,424

[22] Filed: June 9, 1976

Related U.S. Application Data

[62] Division of Ser. No. 535,657, Dec. 23, 1974, abandoned.

[30] Foreign Application Priority Data

Dec. 21, 1973 Japan .................... 48-3111

[51] Int. Cl.$^2$ .................... C08F 8/00; C08F 8/28; C08F 8/30
[52] U.S. Cl. .................... 260/47 UP; 526/15; 526/46; 526/49
[58] Field of Search .................... 260/47 UP

[56] References Cited

U.S. PATENT DOCUMENTS

| | | | |
|---|---|---|---|
| 2,710,801 | 6/1955 | Minsk et al. | 260/47 UP |
| 3,032,522 | 5/1962 | Summers | 260/29.6 |
| 3,267,073 | 8/1966 | Kun | 260/47 UP |
| 3,488,329 | 1/1970 | Johnson | 260/112.5 |
| 3,877,946 | 4/1975 | Tsuji et al. | 96/87 R |
| 3,879,205 | 4/1975 | Fitzgerald | 96/114 |

*Primary Examiner*—Herbert J. Lilling
*Attorney, Agent, or Firm*—Sughrue, Rothwell, Mion, Zinn and Macpeak

[57] ABSTRACT

Water-soluble oxidation-reduction polymers containing therein recurring units of the formula (I):

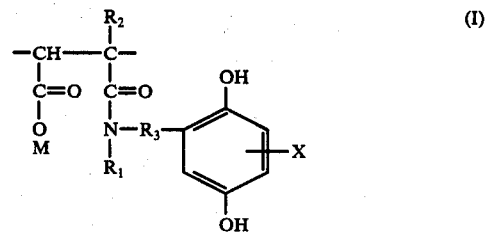

or recurring units of formula (II):

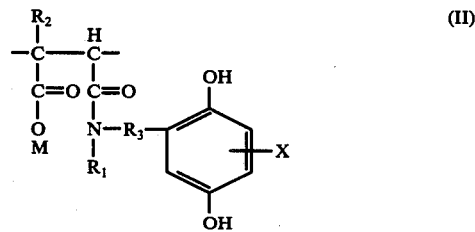

wherein X represents a hydrogen atom, a halogen atom, an alkyl group, an allyl group or an aryl group; $R_1$ represents a hydrogen atom or an alkyl group; $R_2$ represents a hydrogen atom, an alkyl group or an aryl group; $R_3$ represents a divalent group; and M represents a cation. These polymers have excellent oxidation-reduction properties.

10 Claims, No Drawings

WATER-SOLUBLE POLYMERS AND PROCESS FOR PRODUCING THE SAME

This is a Division of application Ser. No. 535,657, filed Dec. 23, 1974, and now abandoned.

BACKGROUND OF THE INVENTION

1. Field of the Invention

The present invention relates to water-soluble polymers. More particularly, the present invention relates to novel water-soluble oxidation-reduction polymers having hydroquinone structures attached to the side chains of the polymers and to processes for producing the same.

2. Description of the Prior Art

Studies of polymers having oxidizing and reducing functions have been made with the objects of utilizing such polymers as an organic oxidant, a monomer stabilizer, an electron exchanger for a battery, or an agent for preparing hydrogen peroxide, removing oxygen contained in water, treating water or waste water in industry and the like. (See U.S. Pat. Nos. 2,992,899; 2,703,792 and 2,831,045; British Pat. Nos. 891,467 and 949,302; *Ann. N.Y. Acad. Sci.*, 57 646 (1959) and *Natl. Acad. Sci., U.S.*, 38 934 (1952).)

These oxidation-reduction polymers contain, as the functional group having oxidizing and reducing properties, hydroquinone groups, thiol groups, ketone groups, pyridine groups or ferrocene groups. Of these functional groups, however, hydroquinones are advantageous for a variety of reasons, e.g., excellent oxidation and reduction reversibility, appropriate oxidation-reduction potentials, stability and diversity of methods for their preparation, as described in large numbers of patents and literature references, e.g., U.S. Pat. Nos. 3,173,892 and 3,165,492; French Patent Nos. 1,362,707; 1,362,708 and 1,336,713; K. A. Kun and H. G. Cassidy, *J. Polymer Sci.*, 44 383 (1960); *ibid.*, 56 83 (1962); R. E. Moser et al., ibid., A2 2401 (1964); N. Nakabayashi, ibid., A-1, 6 869 (1968); G. Wegner, N. Nakabayashi and H. G. Cassidy, *J. Org. Chem.*, 32 3155 (1967); G. Wegner et al., *J. Polymer Sci.*, A-1, 6 3155 (1968); H. Kamogawa, ibid., B-3, 283 (1965); K. A. Kun et al., ibid., A3 1833 (1965); ibid., 4A-1, 847 and 859 (1966), etc.

These known polymers, however, are insoluble or poorly soluble in water and have only small oxidizing and reducing capacities as described, e.g., in H. G. Cassidy and K. A. Kun, *Oxidation-Reduction Polymers*, Interscience, New York (1965). In addition, their preparations are highly complicated.

U.S. Pat. No. 2,816,028 discloses polymers, which contain hydroquinone derivatives in their side chains, of the general formula:

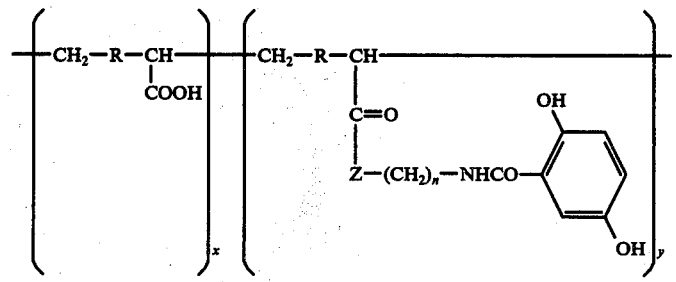

wherein R represents

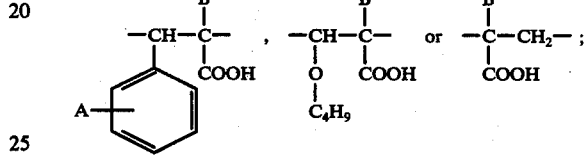

A represents a hydrogen atom, an alkyl group or a halogen atom; B represents a hydrogen atom or an alkyl group; Z represents —O— or —NH—; $x$ and $y$ each represents a positive integer of 50 to 2,000; and $n$ represents a positive integer of 1 to 6.

The above-described polymers are, however, water-insoluble except for those polymers where R is

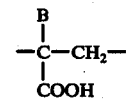

and hence possess only small oxidation-reduction capacities. The polymers in which R is

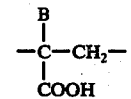

are prepared using, as a starting material, poly(acrylic or methacrylic anhydride), which are obtained by polymerizing acrylic or methacrylic anhydride. However, it is extremely difficult to obtain soluble poly(acrylic or methacrylic anhydride), because the polymerization reaction of acrylic or methacrylic anhydride, each of which contains two double bonds having identical reactivity, is inevitably accompanied by a cross-linking reaction which results in the formation of insoluble gels. Moreover, the above-described polymers are not useful as an additive for photographic materials. This is thought to be due to the reduced oxidizing and reducing properties as a result of the electron-attracting carbonyl groups attached directly to the hydroquinone nuclei of the polymers.

SUMMARY OF THE INVENTION

An object of the present invention is to provide water-soluble oxidation-reduction polymers.

Another object of the present invention is to provide polymers which are useful in photography.

A still further object of the present invention is to provide polymers which are useful in the production of hydrogen peroxide, monomer stabilization, removal of oxygen contained in water, treatment of water or waste water in industry and the like.

Another object of the present invention is to provide a novel and convenient process for producing polymers having hydroquinone groups in their side chains.

Still another object of the present invention is to provide additives capable of preventing color contamination.

The polymers of the present invention can be represented as polymers containing therein recurring units of the general formula (I) or (II):

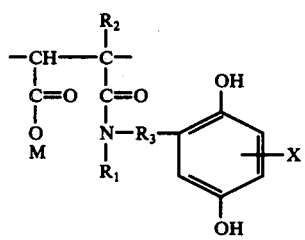  (I)

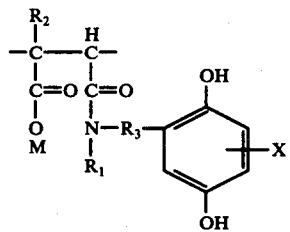  (II)

wherein X represents a hydrogen atom, a halogen atom such as chlorine, bromine, etc., an alkyl group having preferably from 1 to 8 carbon atoms, an allyl group or an aryl group; $R_1$ represents a hydrogen atom or an alkyl group having preferably from 1 to 8 carbon atoms; $R_2$ represents a hydrogen atom, an alkyl group or an aryl group; $R_3$ represents a divalent group; M represents a cation.

The polymers of the present invention can be prepared by reacting a hydroquinone compound or a salt thereof having the general formula (III):

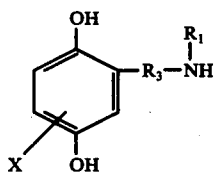  (III)

wherein X, $R_1$ and $R_3$ are as defined above, with a polymer containing therein the recurring unit of the formula (IV):

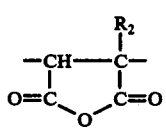  (IV)

wherein $R_2$ is as defined above followed, if necessary, by neutralization.

DETAILED DESCRIPTION OF THE INVENTION

The hydroquinones or their salts represented by the formula (III) can be obtained by the methods described, e.g., in U.S. Pat. Nos. 3,062,884; 3,134,764 and 3,187,046; or in U.S. Patent Application Ser. No. 524,835, filed Nov. 18, 1974, (corresponding to Japanese Patent Application No. 128986/1973).

In the above general formulas, suitable examples of alkyl groups for X are alkyl groups such as a methyl group, a tert-butyl group, a 1,1,3,3-tetramethylbutyl group, etc. Suitable examples of aryl groups for X are aryl groups such as a phenyl group, a naphthyl group, a halogenated aryl group (e.g., a bromophenyl group, a chlorophenyl group, etc.), etc. Suitable examples of alkyl groups for $R_1$ are alkyl groups such as a methyl group, an ethyl group, etc. Suitable examples of alkyl groups for $R_2$ are alkyl groups having 1 to 2 carbon atoms such as a methyl group and suitable examples of aryl groups for $R_2$ are aryl groups such as a phenyl group. Suitable examples of divalent groups for $R_3$ are divalent groups such as a straight chain alkylene group having from 1 to 8 carbon atoms, a branched chain alkylene group having from 1 to 8 carbon atoms, an arylene group or a group having the formula

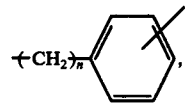

wherein n is an integer of 1 to 4. Suitable examples of straight chain alkylene groups for $R_3$ are alkylene groups such as $-CH_2-$, $-(CH_2)_2-$, $-(CH_2)_3-$, etc., and suitable examples of branched chain alkylene groups for $R_3$ are $-CH(CH_3)-CH_2-$ and $-CH(C_2H_5)CH_2CH_2-$. Suitable examples of arylene groups for $R_3$ are arylene groups having the formula

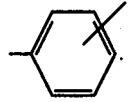

Suitable examples of substituents which can be present on the above described groups for $R_3$ include an alkyl group (e.g., a methyl group, etc.), an alkoxy group (e.g., a methoxy group, etc.) and a halogen atom (e.g., a chlorine atom, etc.). Suitable examples of M are a hydrogen atom, an alkali metal atom (e.g., a sodium atom, a potassium atom, etc.) and a quaternary ammonium group (e.g., $HN^+(CH_3)_3$ and $HN^+(C_2H_5)_3$).

There is no critical limit on the total number of carbon atoms in X, $R_3$ and $R_1$, however, the total number is preferably less than about 20, more preferably less than 15, from the standpoint of solubility.

Examples of compounds represented by the general formula (III) or their derivatives are as follows:

Aminoalkylhydroquinones or their derivatives, such as 2,5-dihydroxybenzylamine, 2-aminoethylhydroquinone, 2-(3'-aminopropyl)hydroquinone, 2-(2'-aminopropyl)hydroquinone, 2,5-dihydroxy-3-methylbenzylamine, 2,5-dihydroxy-3-ethylbenzylamine, 2,5-dihydroxy-3-t-butylbenzylamine, 2,5-dihydroxy-3-bromobenzylamine, 2,5-dihydroxy-6-bromobenzylamine, 2,5-dihydroxy-3-chlorobenzylamine, 2-(2'-aminobutyl)hydroquinone, 2-(3'-amino-1'-methylbutyl)-hydroquinone, 2-(3'-aminopropyl)-6-methylhydroquinone, 2-(3'-aminopropyl)-6-ethylhydroquinone, 2-(3'-aminopropyl)-6-t-butylhydroquinone, 2-(3'-amino-propyl)-6-bromohydroquinone, 2-(3'-aminopropyl)-6-chlorohydroquinone, 2-(3'-aminopropyl)-3-bromohydroquinone, 2-(2'-aminopropyl)-6-methylhydroquinone, 2-(2'-aminopropyl)-6-ethylhydroquinone, 2-(2'-aminopropyl)-6-t-butylhydroquinone, 2-(2'-aminopropyl)-6-bromohydroquinone, 2-(2'-aminopropyl)-6-chlorohydroquinone, 2-(2'-aminopropyl)-3-bromohydroquinone, 2-(2'-aminobutyl)-6-methylhydroquinone, 2-(2'-aminobutyl)-6-ethylhydroquinone, 2-(2'-aminopropyl)-6-t-butylhydroquinone, 2-(2'-aminobutyl)-6-bromohydroquinone, 2-(2'-aminobutyl)-3-bromohydroquinone, 2-(3'-amino-1'-methylbutyl)-6-methylhydroquinone, 2-(3'-amino-1'-methylbutyl)-6-ethylhydroquinone, 2-(3'-amino-1'-methylbutyl)-6-t-butylhydroquinone, 2-(3'-amino-1'-methylbutyl)-6-bromohydroquinone, 2-(3'-amino-1'-methylbutyl)-3-bromohydroquinone or their salts;

Aminoarylalkylhydroquinones or their derivatives such as p-aminophenethylhydroquinone, 2-(4'-aminonaphthylethyl)-hydroquinone, 2-(p-aminophenethyl)-5-methylhydroquinone, 2-(p-aminophenethyl)-5-chlorohydroquinone, 2-(3'-methyl-4'-aminophenethyl)-hydroquinone, 2-(p-aminophenethyl)-5,6-dimethylhydroquinone, 2-(p-aminophenethyl)-3,5,6-trimethylhydroquinone, 2-m-aminophenethylhydroquinone, 2-[γ-(4'-aminophenyl)-β-methylpropyl]hydroquinone, 2-[γ-(4'-aminophenyl)propyl]hydroquinone, 2-(4'-amino-3'-methoxyphenethyl)hydroquinone, 2-[γ-(3'-amino-4'-methylphenyl)propyl]hydroquinone, 2-(p-aminophenethyl)-6-methylhydroquinone, 2-(p-aminophenethyl)-5-bromohydroquinone, 2-(5'-aminonaphthylethyl)hydroquinone or their salts;

N-(2,5-dihydroxyphenylalkyl)alkylamines or their derivatives, such as N-(2,5-dihydroxyphenylmethyl)-methylamine, N-(2,5-dihydroxyphenylethyl)methylamine, N-(2,5-dihydroxyphenyl propyl)methylamine, N-[2-(2',5'-dihydroxyphenyl)-1-methylethyl]-methylamine, N-(2,5-dihydroxyphenylmethyl)ethylamine, N-(2,5-dihydroxyphenylethyl)ethylamine, N-(2,5-dihydroxyphenylpropyl)-ethylamine, N-(2,5-dihydroxyphenylmethyl)butylamine, N-(2,5-dihydroxy-3-methylphenylmethyl)methylamine or their salts;

N-(2,5-dihydroxyphenylalkylaryl)alkylamines or their derivatives, such as p-(2,5-dihydroxyphenethyl)-N-methylaniline, p-(2,5-dihydroxyphenethyl)-N-ethylaniline, N-[4-(2',5'-dihydroxyphenethyl)naphthyl]-methylamine, o-(2,5-dihydroxyphenethyl)-N-methylaniline, o-(2,5-dihydroxy-3-methylphenethyl)-N-ethylaniline or their salts and the like.

Examples of acids which can form salts with the compounds of the formula (III) include inorganic acids, such as a hydrohalic acids, sulfuric acid, nitric acid, carbonic acid, boric acid, etc.; and organic acids, such as formic acid, acetic acid, trifluoroacetic acid, oxalic acid, malonic acid, succinic acid, maleic acid, acrylic acid, methacrylic acid, salicyclic acid, benzoic acid, itaconic acid, etc.

Of these compounds, aminoalkylhydroquinones, aminoarylalkylhydroquinones, N-(2,5-dihydroxyphenylalkyl)alkylamines and their derivatives or salts are particularly advantageous from the standpoint of the solubility of the redox polymers produced.

Examples of homo- and copolymers containing recurring units of the general formula (IV) include homo- and copolymers obtained from maleic anhydride, citraconic anhydride or phenylmaleic anhydride.

These homopolymers can be advantageously prepared with reference to the methods described, e.g., in published Japanese Patent Application No. 55,980/48; J. L. Lang, J. Polymer Sci., 55 S 31 (1961); D. Bryce-Smith, Chem. and Ind., 2062 (1962); V. I. Stenberg, J. Org. Chem., 27 4111; and German Patent No. 1,662,080.

The copolymers can be prepared by copolymerizing these monomers with other monomers.

Any monomeric compound having at least one unsaturated bond capable of addition polymerization can be generally used for copolymerization with maleic anhydride, citraconic anhydride or phenylmaleic anhydride. Examples of such unsaturated monomeric compounds are as follows:

Acrylic acids, such as acrylic acid and acrylates, e.g., ethyl acrylate, propyl acrylate, butyl acrylate, amyl acrylate, ethylhexyl acrylate, octyl acrylate, t-octyl acrylate, 2-methoxyethyl acrylate, 2-butoxyethyl acrylate, 2-phenoxyethyl acrylate, chloroethyl acrylate, cyanoethyl acrylate, dimethylaminoethyl acrylate, glycidyl acrylate, benzyl acrylate, methoxybenzyl acrylate, furfuryl acrylate, tetrahydrofurfuryl acrylate, phenyl acrylate, etc.;

Methacrylic acids, such as methacrylic acid and methacrylates, e.g., methyl methacrylate, ethyl methacrylate, propyl methacrylate, isopropyl methacrylate, amyl methacrylate, hexyl methacrylate, cyclohexyl methacrylate, benzyl methacrylate, cyanoacetoxyethyl methacrylate, chlorobenzyl methacrylate, octyl methacrylate, sulfopropyl methacrylate, N-ethyl-N-phenylaminoethyl methacrylate, glycidyl methacrylate, 2-methoxyethyl methacrylate, 2-(3-phenylpropyloxy)ethyl methacrylate, dimethylaminophenoxyethyl methacrylate, furfuryl methacrylate, tetrahydrofurfuryl methacrylate, phenyl methacrylate, etc.;

Acrylamides, such as acrylamide and N-substituted acrylamides, e.g., methylacrylamide, ethylacrylamide, propylacrylamide, isopropylacrylamide, butylacrylamide, t-butylacrylamide, heptylacrylamide, t-octylacrylamide, cyclohexylacrylamide, benzylacrylamide, methoxyethylacrylamide, dimethylaminoethylacrylamide, phenylacrylamide, tolylacrylamide, naphthylacrylamide, dimethylacrylamide, diethylacrylamide, dibutylacrylamide, diisobutylacrylamide, diacetonacrylamide, methylbenzylacrylamide, benzyloxyethylacrylamide, β-cyanoethylacrylamide, acryloylmorpholine, N-methyl-N-acryloylpiperazine, N-acryloylpiperazine, acryloylglycine, N-β-morpholinoethylacrylamide, N-acryloylhexamethyleneimine, N-2-acetoamidethyl-N-acetylacrylamide, etc.;

Methacrylamides, such as methacrylamide and N-substituted methacrylamides, e.g., methylmethacrylamide, t-butylmethacrylamide, t-octylmethacrylamide, benzylmethacrylamide, cyclohexylmethacrylamide, phenylmethacrylamide, dimethylmethacrylamide, diethylmethacrylamide, dipropylmethacrylamide, N-methyl-N-phenylmethacrylamide, etc.;

Allyl compounds such as allyl esters, e.g., allyl acetate, allyl caproate, allyl caprylate, allyl laurate, allyl palmitate, allyl stearate, allyl benzoate, allyl acetoacetate, etc.; and allyl ethers, e.g., allyl butyl ether, allyl glycidyl ether, allyl phenyl ether, etc.;

Vinyl ethers such as methyl vinyl ether, butyl vinyl ether, hexyl vinyl ether, octyl vinyl ether, decyl vinyl ether, ethylhexyl vinyl ether, methoxyethyl vinyl ether, chloroethyl vinyl ether, 1-methyl-2,2-dimethylpropyl vinyl ether, 2-ethylbutyl vinyl ether, dimethylaminoethyl vinyl ether, diethylaminoethyl vinyl ether, butylaminoethyl vinyl ether, benzyl vinyl ether, tetrahydrofurfuryl vinyl ether, vinyl phenyl ether, vinyl tolyl ether, vinyl chlorophenyl ether, vinyl 2,4-dichlorophenyl ether, vinyl naphthyl ether, vinyl anthranil ether, etc.;

Vinyl esters such as vinyl acetate, vinyl propionate, vinyl butyrate, vinyl isobutyrate, vinyl dimethylpropionate, vinyl ethylbutyrate, vinyl valerate, vinyl caproate, vinyl chloroacetate, vinyl dichloroacetate, vinyl methoxyacetate, vinyl butoxyacetate, vinyl phenylacetate, vinyl lactate, vinyl $\beta$-phenylbutyrate, vinyl cyclohexylcarboxylate, vinyl benzoate, vinyl salicylate, vinyl tetrachlorobenzoate, vinyl naphthoate, etc.;

Heterocyclic vinyl compounds such as N-vinyloxazolidone, vinylpyridine, vinylpicoline, N-vinylimidazole, N-vinylpyrrolidone, N-vinylcarbazole, vinylthiophene, N-vinylethylacetamide, etc.;

Styrenes such as styrene, methylstyrene, dimethylstyrene, trimethylstyrene, ethylstyrene, diethylstyrene, isopropylstyrene, butylstyrene, hexylstyrene, cyclohexylstyrene, decylstyrene, benzylstyrene, chloromethylstyrene, trifluoromethylstyrene, ethoxymethylstyrene, acetoxymethylstyrene, methoxystyrene, 4-methoxy-3-methylstyrene, dimethoxystyrene, chlorostyrene, dichlorostyrene, trichlorostyrene, tetrachlorostyrene, pentachlorostyrene, bromostyrene, dibromostyrene, iodostyrene, fluorostyrene, trifluorostyrene, 2-bromo-4-trifluoromethylstyrene, 4-fluoro-3-trifluoromethylstyrene, vinylbenzoic acid, methyl vinylbenzoate, etc.;

Vinyl ketones such as methyl vinyl ketone, phenyl vinyl ketone, methoxyethyl vinyl ketone, etc.;

Olefins such as dicyclopentadiene, ethylene, propylene, 1-butene, 1-pentene, 1-hexene, 4-methyl-1-pentene, 1-heptene, 1-octene, 1-decene, 5-methyl-1-nonene, 5,5-dimethyl-1-octene, 4-methyl-1-hexene, 4,4-dimethyl-1-pentene, 5-methyl-1-hexene, 4-methyl-1-heptene, 5-methyl-1-heptene, 4,4-dimethyl-1-hexene, 5,6,6-trimethyl-1-heptene, 1-dodecene, 1-octadecene, etc.;

Itaconic acids such as itaconic acid, itaconic anhydride, methyl itaconate, ethyl itaconate, etc.;

Crotonic acids such as crotonic acid, methyl crotonate, ethyl crotonate, butyl crotonate, hexyl crotonate, crotonamide, etc.;

Halogenated olefins such as vinyl chloride, vinylidene chloride, chloroprene, etc.;

Unsaturated nitriles such as acrylonitrile, methacrylonitrile, etc.; and

Unsaturated compounds such as sorbic acid, cinnamic acid, methyl sorbate, glycidyl sorbate, citraconic acid, chloroacrylic acid, mesaconic acid, maleic acid, fumaric acid, ethacrylic acid, etc.

Mixtures of these compounds can also be used. Of these monomeric compounds, acrylamides, methacrylamides, vinyl ethers, acrylic acid, vinyl acetate, N-vinylpyrrolidone and the like are particularly preferred from the standpoint of water solubility of the oxidation-reduction polymers produced.

These polymers can be advantageously prepared with reference to the methods described, e.g., in U.S. Pat. Nos. 2,419,221; 2,857,365; 2,854,357; 2,917,478; 2,938,016; 2,971,939; 3,046,246; 2,694,697; 3,060,155; 3,010,864; 3,083,189 and 3,073,805; British Patent No. 609,940; H. C. Hass et al., *J. Polymer Sci.*, A 11 327 (1973); C. E. Schildknecht, *Vinyl and Related Polymers* 2nd Printing, John Wiley and Sons, (1959); H. Mark, *Encyclopedia of Polymer Science and Technology* Interscience Pub. New York, (1967); E. C. Chapin, *J. Polymer Sci.*, 4 597 (1949) and the like. In the preparation of these polymers, reaction conditions such as initiator and solvent used, concentration, polymerization temperature, reaction time, can be, of course, varied readily and widely in accordance with the purpose.

There is no particular limit as to the properties of the polymers or copolymers containing the acid anhydride units which can be employed in accordance with the present invention. However, these homopolymers or copolymers preferably have a molecular weight of about 500 to about 500,000; more preferably about 1,000 to about 20,000. These ranges, however, change according to the monomer polymerized. The copolymers are usually obtained in the form of 1:1 molar ratio copolymers when prepared by conventional methods, but those containing from about 20% to about 60% on a molar basis, particularly from about 40% to about 50% on a molar basis acid anhydride units, which can be prepared by changing the starting material charging ratio, are preferred for the convenience of operations.

The methods for reacting the compounds of the formula (III) or the salts thereof with the polymers having the recurring units of the formula (IV) are known, and the conditions of the reaction can be readily determined to those skilled in the art, The reaction can, if desired, be carried out (1) by using the compounds of the formula (III) or the salts thereof in an amount of about 0.2 to about 2.5 molar equivalents, preferably about 0.5 to about 1.5 molar equivalents; (2) in an atmosphere of an inert gas, for example, methane, ethane, propane, butane, argon and the like; (3) by heating the reaction mixture to a temperature of about 30° C to about 150° C, preferably 60° C to 90° C; (4) by cooling the reaction mixture to from about 15° C to about −10° C; (5) with vigorous stirring; (6) in the presence of a reducing agent or an antioxidant; and (7) by employing a basic compound in combination with a salt of the compounds represented by the formula (III).

In the reaction, a solvent can be advantageously used in order to make the reaction system homogeneous and avoid a localized increase in temperature. Suitable solvents which can be employed can be chosen without difficulty by those skilled in the art by considering solubility, convenience in drying the product, reactivity, compatibility with water, price and the like. Examples of useful solvents include alcohols such as methanol, ethanol, isopropanol, methoxyethanol, acetoxyethanol, ethylene glycol, diethylene glycol, propylene glycol, methoxypropanol, phenoxyethanol, phenylpropanol, cyclohexanol, benzyl alcohol, phenol, t-butylphenol, furfuryl alcohol, tripropylene glycol and the like; hydrocarbons such as hexane, ligroin, cyclohexane, decalin, octane and the like; halogenated hydrocarbons such as dichloromethane, chloroform, methylchloroform, carbon tetrachloride, dichloroethane, trichloroethane, chlorobenzene, dichlorobenzene and the like; ethers such as diethyl ether, dimethoxyethane, diisopropyl ether, ethyl phenyl ether, tetrahydrofuran, dioxane, anisole, propylene oxide, morpholine and the like; aromatic hydrocarbons such as benzene, toluene, xylene, ethylbenzene, cymene, cumene, styrene and the like; lactones and lactams such as butyrolactone, acetylbutyrolactone, pyrrolidone, N-methylpyrrolidone, vinylpyrrolidone and the like; amides such as dimethylformamide, diethylformamide, formamide, diethylacetamide, hexamethylenephosphoramide, tetramethylurea and the like; ketones such as acetone, methyl ethyl ketone, mesityl oxide, ethyl isobutyl ketone, diacetone alcohol, cyclohexanone, methylcyclohexanone, acetophenone and the like; acetonitrile; nitropropane; dimethylcyanamide; carbon disulfide; dimethyl sulfoxide; methyl ethyl sulfoxide; diethyl sulfoxide; sulfolane; esters such as methyl formate, dimethyl phthalate, methyl acetate, ethyl acetate, cyclohexyl acetate, amyl acetate, butyl acetate, β-methoxyethyl acetate, β-butoxyethyl acetate, propyl propionate, dimethyl oxalate, dimethyl maleate and the like; acids such as formic acid, acetic acid, butyric acid, acrylic acid, methacrylic acid and the like; amines such as pyridine; etc. Mixtures of these solvents can also be used, if desired.

These solvents can be used in an amount sufficient to dissolve or disperse homogeneously the compounds represented by the formula (III) or their salts and the polymers or copolymers represented by the formula (IV) in a concentration of about 0.1% to about 20% by weight.

Examples of basic compounds which can be employed in combination with a salt of the compounds represented by the formula (III) include hydroxides of alkali metals such as lithium, sodium, potassium, etc., alkaline earth metals such as magnesium, calcium, etc., and ammonia or their salts of weak acids, such as carbonates, borates, acetates, etc.; and amines such as alkylamines, for example, ethylamine, diethylamine, triethylamine, butylamine, t-butylamine, methylpropylamine, monomethylethylbutylamine, diethylmethylamine, etc., substituted alkylamines, for example, ethanolamine, methylaminoethanol, triethanolamine, etc. polyalkylene polyamines, for example, ethylenediamine, diethylenetriamine, etc., alkenylamines, for example, allylamine, diallylamine, etc., arylamines, for example, aniline, anisidine, naphthylamine, toluidine, N,N-dimethylaniline, etc., arylalkylamines, for example, benzylamine, phenethylamine, N-methylbenzylamine, etc., and nitrogen-containing heterocyclic compounds, for example, pyridine, piperidine, piperazine, diaminobicyclooctane, N-methylpiperazine, morpholine, pyrrolidine, pyrazoline, indoline, 1,8-diaza-bicyclo(5,4,0)undecene-7, etc.

Mixtures of these compounds can also be used. Suitable basic compounds to be used can be chosen without difficulty by those skilled in the art on considering solubility, basicity, odor, price and the like. Of these compounds, carbonates and organic acids are particularly preferred. The amount of these compounds employed is preferably about 0.2 to 3, more preferably 0.5 to 2 molar equivalents, based on the moles of the salts of the compounds represented by the formula (III).

In the half-amidation reaction, a third ingredient can be added to prevent the air oxidation of the hydroquinones. Examples of such reductants or antioxidants include combinations of a metal such as tin, iron, zinc, zinc amalgam, etc., and an acid such as hydrochloric acid, sulfuric acid, acetic acid, etc.; combinations of a metal such as sodium, sodium amalgam, magnesium, magnesium amalgam, zinc, iron, etc., and water (having various pH values); combinations of a metal such as sodium, lithium, aluminum, magnesium amalgam, zinc, etc., and an alcohol; combinations of a metal such as sodium, zinc, etc., and an alkali such as an alkali metal hydroxide, an alcoholic alkali, liquid ammonia, etc.; metallic compounds having a lower valence such as stannous chloride, ferrous sulfate, ferrous hydroxide, titanium trichloride, etc.; non-metallic compounds which act as an oxygen-acceptor such as hydrogen halide, a sulfur compound, e.g., sodium sulfide, sodium polysulfide, ammonium sulfide, sodium sulfite, sodium dithionite, hydrogen sulfide, etc., a phosphorus compound, e.g., phosphorous trisulfide, phosphorous acid and their salts, etc., and an arsenic compound, e.g., an arsenite; hydrazines such as hydrazine, phenylhydrazine, hydroxylamine, etc.; aluminum hydride; sodium borohydride; and hydroquinone derivatives such as hydroquinone monomethyl ether, hydroquinone monoethyl ether, 2-methylhydroquinone, 2-methoxyhydroquinone, 2-t-butylhydroquinone, 2,5-di-t-butylhydroquinone, 2,5-di-t-hexylhydroquinone, 2,5-bis-(1′,1′,3′,3′-tetramethylbutyl)hydroquinone, etc. Mixtures of these compounds can also be used. The amount of these compounds employed is preferably more than about 0.001, particularly from about 0.01 to about 100% by weight, based on the weight of the compounds represented by the formula (III) or the salts thereof. However, the amounts can be changed depending on the compounds used.

The polymers thus obtained, which are represented by the formula (I) or (II), are water-soluble polymers having a molecular weight of about 600 to about 600,000, preferably about 1,000 to about 20,000.

Examples of the water-soluble polymers within the scope of the present invention are as follows:

Compound 1

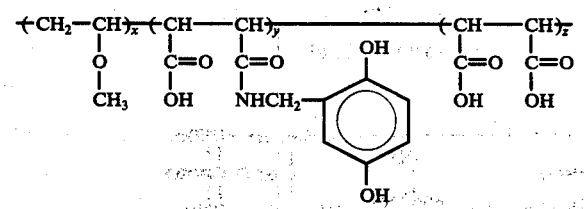

x : y : z = 50 : 49 : 1

-continued
Compound 2
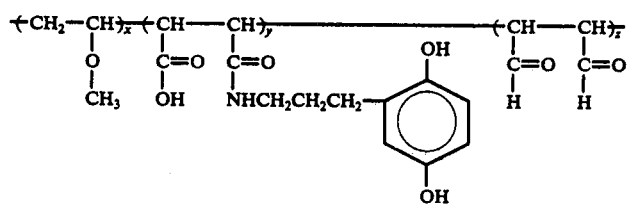
x : y : z = 50 : 45 : 5
Compound 3
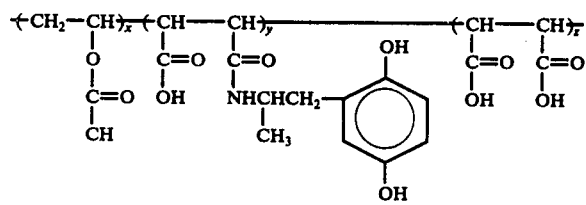
x : y : z = 50 : 47 : 3
Compound 4
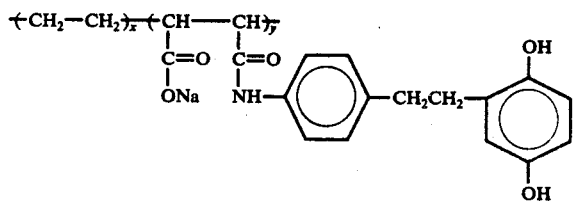
x : y = 50 : 50
Compound 5
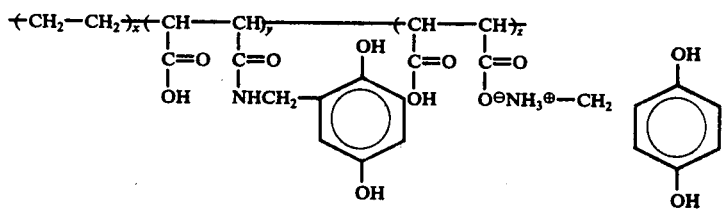
x : y : z = 50 : 45 : 5
Compound 6
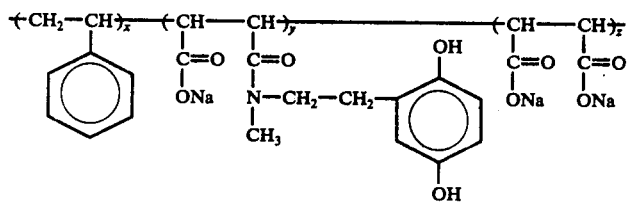
x : y : z = 50 : 40 : 10
Compound 7
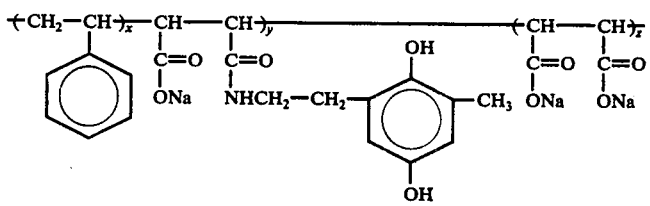
x : y : z = 50 : 42 : 8

-continued
Compound 8
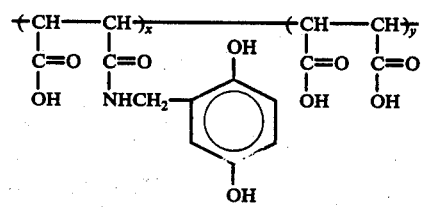
x : y = 80 : 20
Compound 9
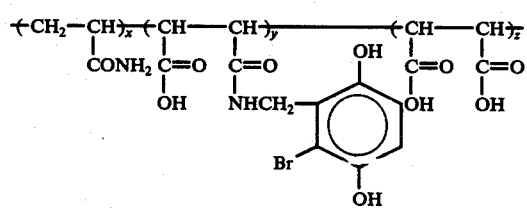
x : y : z = 50 : 47 : 3
Compound 10
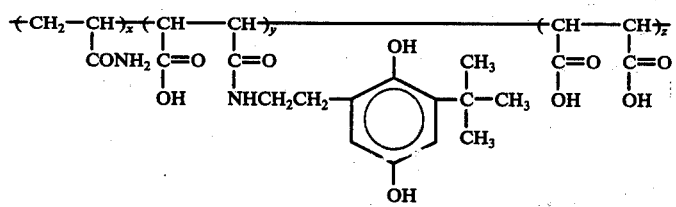
x : y : z = 60 : 35 : 5
Compound 11
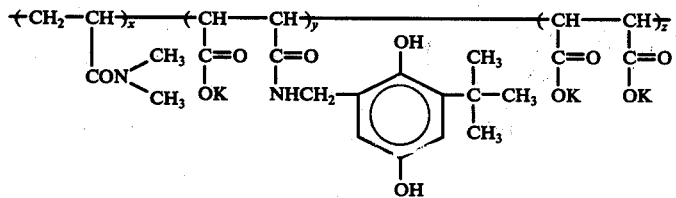
x : y : z = 50 : 38 : 12
Compound 12
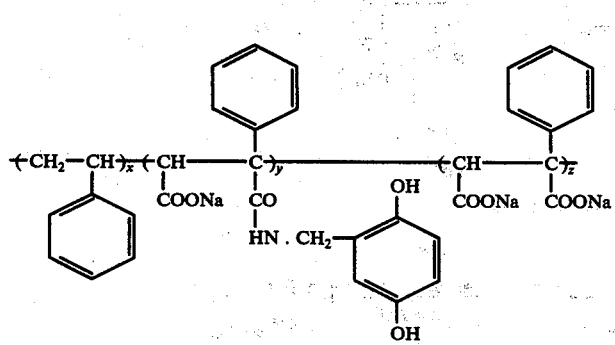
x : y : z = 50 : 25 : 25

-continued
Compound 13
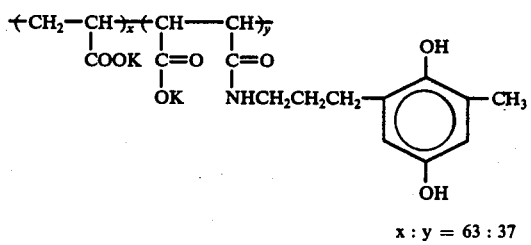
x : y = 63 : 37
Compound 14
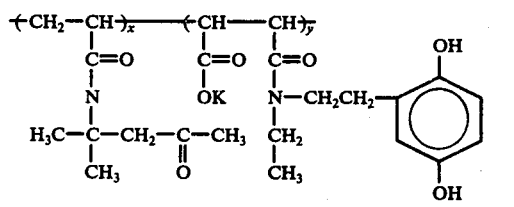
x : y = 55 : 45
Compound 15
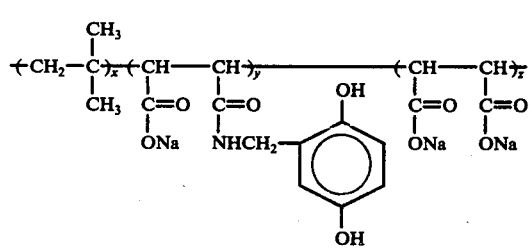
x : y : z = 50 : 45 : 5
Compound 16
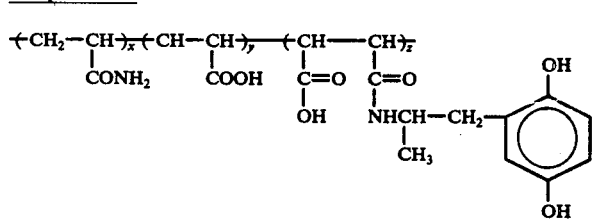
x : y : z = 40 : 35 : 25
Compound 17
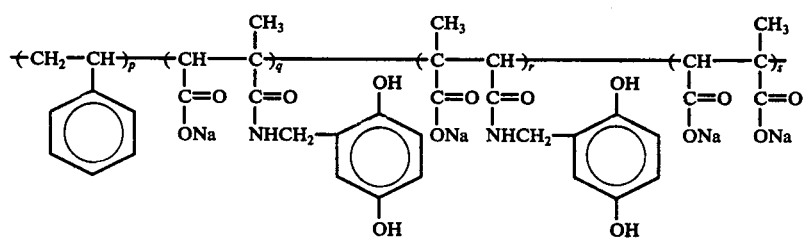
p : q : r : s = 50 : 23 : 23 : 4
Compound 18
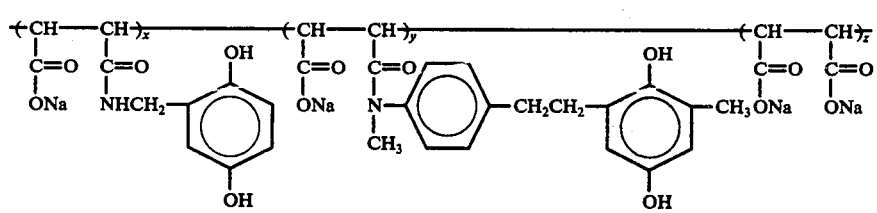

$x : y : z = 48 : 46 : 6$

Compound 19

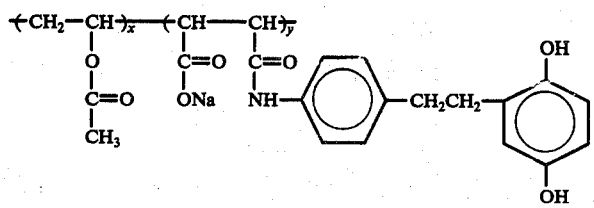

$x : y = 50 : 50$

Compound 20

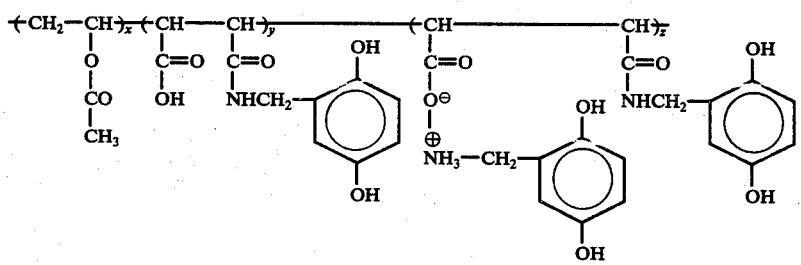

$x : y : z = 50 : 48 : 2$

Compound 21

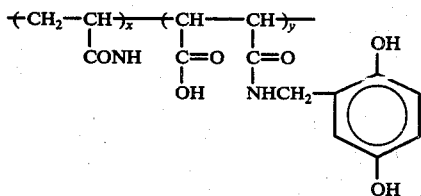

$x : y = 56 : 44$

Compound 22

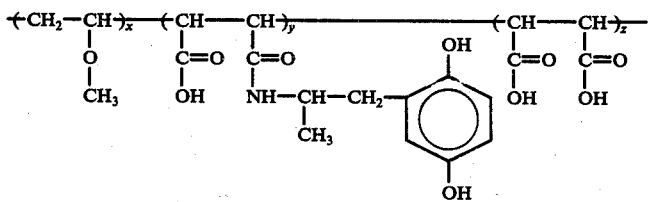

$x : y : z = 50 : 48 : 2$

Compound 23

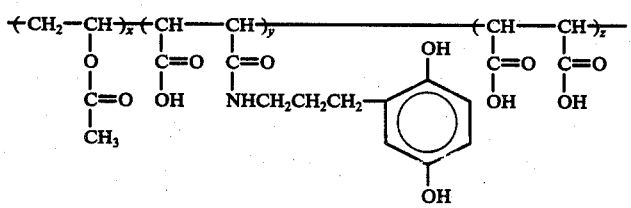

$x : y : z = 50 : 47 : 3$

Compounds 1, 2, 4, 5, 8, 10, 13, 19, 20 and 21 are particularly preferred compounds of this invention.

The water-soluble polymers of the present invention can be employed as an oxidation-reduction polymeric material. They can be utilized, for example, in the preparation of hydrogen peroxide, the removing of oxygen contained in water and the treatment of water or waste water in industry, or as a monomer stabilizer or an organic antioxidant. The polymers can also be used in a photographic light-sensitive material to improve the physical characteristics, for example, to prevent color staining to a great extent.

The present invention is further illustrated by the following examples. Unless otherwise indicated, all parts, percents, ratios and the like are by weight.

EXAMPLE 1

Preparation of Compound 1

To a 2 l three-necked flask equipped with a stirring rod, a thermometer, a gas-delivery tube and a dropping-funnel, and placed on a steam bath, were added 10 g of 2,5-dihydroxybenzylamine and 200 ml of N,N-dimethylformamide, and the materials dissolved. Nitrogen gas was passed through the reactor to displace the air, and the temperature was increased to 70° C. A solution of 56.1 g of copoly(methyl vinyl ether-maleic anhydride) (molar ratio = 1:1) in 300 ml of N,N-dimethylformamide was added over a period of about 20 minutes. Immediately after the beginning of the addition, 40 g of powdered 2,5-dihydroxybenzylamine were added portionwise over a period of 15 minutes. After the addition was completed, the reaction solution was stirred for an additional 3.5 hours, and cooled to 35° C, and 600 ml of dichloromethane was poured into the reaction mixture. The resulting mixture was then poured into 2 l of dichloromethane to reprecipitate while stirring with an agitator, and the agitation was continued an additional 30 minutes. The resulting mixture was allowed to stand to precipitate, the solvent was removed by decantation, and 1.5 l of dichloromethane was rapidly poured therein. After the agitation was continued an additional 1.5 hours, the precipitate was filtered by suction, washed with three 150 ml portions of dichloromethane, and immediately freeze-dried to give 98 g of a brown powder.

|  | Elemental Analysis | | |
| --- | --- | --- | --- |
|  | C | H | N |
| Calculated (%) | 56.95 | 5.76 | 4.75 |
| Found (%) | 57.18 | 5.62 | 4.67 |

The product had a limiting viscosity, as determined in a 1% aqueous sodium chloride solution at 30° C, of 0.25.

EXAMPLE 2

Preparation of Compound 2

To a 500 ml three-necked flask equipped with a stirrer, a thermometer and a gas-delivery tube, and placed on a steam bath, were added 10 g of 2-(3-aminopropyl)-hydroquinone hydrobromide, 3.75 g of copoly(methyl vinyl ether-maleic anhydride) (molar ratio = 1:1) and 360 ml of N,N-dimethylformamide, and the materials dissolved. After the temperature was increased to 70° C, 4.13 g of sodium hydrogen carbonate was added portionwise over a period of about 5 minutes with the addition of 10 ml of distilled water. The reaction mixture was stirred for an additional 3 hours, and then poured into 1.5 l of dichloromethane to form a precipitate while stirring with an agitator. The precipitate was dissolved in 150 ml of distilled water. The resulting solution was charged in a cellulose tube (semipermeable membrane) and dialyzed about 25 hours against running water. The mixture was freeze-dried to obtain 13.2 g of a light brown powder.

|  | Elemental Analysis | | |
| --- | --- | --- | --- |
|  | C | H | N |
| Found (%) | 51.43 | 6.07 | 3.46 |

The product had a limiting viscosity, as determined in a 1% aqueous sodium chloride solution at 30° C, of 0.32.

EXAMPLE 3

Preparation of Compound 3

To a 2 l three-necked flask equipped with a stirrer, a thermometer and a gas-delivery tube, and placed on a steam bath, were added 65.5 g of copoly(vinyl acetate-maleic anhydride) (molar ratio = 1:1), 88.3 g of 2-(2-aminopropyl)hydroquinone and 875 ml of N,N-dimethylformamide, and the materials dissolved. After the temperature was increased to 70° C, 29.9 g of sodium hydrogen carbonate was added over a period of about 20 minutes with the addition of 50 ml of distilled water. The reaction mixture was stirred an additional 3.5 hours at 70° C, and poured into 3.5 l of dichloromethane while stirring with an agitator. The precipitate formed was dissolved in 1,000 ml of distilled water, and the resulting solution was charged in a cellulose tube, and dialyzed against running water. The resulting solution was dried in a freeze drier to obtain 9.26 g of light brown powder.

|  | Elemental Analysis | | |
| --- | --- | --- | --- |
|  | C | H | N |
| Found (%) | 53.62 | 4.10 | 2.84 |

The product had a limiting viscosity, as determined in a 1% aqueous sodium chloride solution at 30° C, of 0.47.

EXAMPLE 4

Preparation of Compound 5

To a 3 l three-necked flask equipped with a stirrer, a thermometer, a gas-delivery tube and a dropping-funnel, and placed on a steam bath, were added 76 g of 2,5-dihydroxybenzylamine and N,N-dimethylformamide, and the materials dissolved. Nitrogen gas was passed through the reactor to displace the air, and the temperature was increased to 75° C. A solution of 100 g of copoly(ethylene-maleic anhydride) (molar ratio = 1:1) in 100 ml of N,N-dimethylformamide was added dropwise to the mixture over a period of about 20 minutes. Immediately after the beginning of the addition, 40 g of powdered 2,5-dihydroxybenzene was added portionwise over a period of about 15 minutes. The resulting mixture was stirred an additional 3 hours at 75° C, and poured into 12 l of dichloromethane while stirring with an agitator. After stirring about 30 minutes, the reaction mixture was allowed to stand to precipitate, and the solvent was then removed by decantation. 6 l of dichloromethane was poured quickly on the precipitate, and the agitator was operated one hour. The precipitate was filtered, washed with three 400 ml portions of dichloromethane, and immediately freeze-dried. The yield of the product was 193 g.

|          | Elemental Analysis |      |      |
|----------|--------------------|------|------|
|          | C                  | H    | N    |
| Found (%)| 58.62              | 5.97 | 5.30 |

The product had a limiting viscosity, as determined in a 1% aqueous sodium chloride solution at 30° C, of 0.21.

EXAMPLE 5

Preparation of Compound 9

To a 1 l three-necked flask equipped with a stirrer, a thermometer and a gas-delivery tube, and placed on a steam bath, were added 20 g of 2,5-dihydroxy-6-bromobenzylamine hydrobromide, 113 g of copoly(acrylamide-maleic anhydride) (molar ratio = 1:1) and 500 ml of N,N,-dimethylformamide, and the materials dispersed. After the temperature was increased to 80° C, 3.55 g of sodium carbonate was added thereto over a period of about 10 minutes with the addition of 100 ml of distilled water. The reaction mixture was stirred an additional 3 hours at 80° C, and poured into 25 l of dichloromethane while stirring with an agitator. The precipitate obtained was dissolved in 200 ml of distilled water, and the resulting solution was changed in a cellulose tube, and dialyzed against running water. The resulting solution was dried in a freeze drier to obtain 22.5 g of a brown powder.

|          | Elemental Analysis |      |      |
|----------|--------------------|------|------|
|          | C                  | H    | N    |
| Found (%)| 4.08               | 3.40 | 6.80 |

The product had a limiting viscosity, as determined in a 1% aqueous sodium chloride solution at 30° C, or 0.10.

EXAMPLE 6

Preparation of Compound 11

To a 2 l three-necked flask equipped with a stirrer, a thermometer, a gas-delivery tube and a dropping-funnel, and placed on a steam bath, were added 10 g of 2,5-dihydroxy-3-t-butylbenzene and 300 ml of N,N-dimethylformamide, and the materials dissolved. Nitrogen gas was passed through the reactor to replace the air, and the temperature was increased to 75° C. A solution of 20.2 g of copoly(N,N-dimethylacrylamidemaleic anhydride) (molar ratio = 1:1) in 200 ml of N,N-dimethylformamide was added dropwise over a period of about 15 minutes. Immediately after the beginning of the addition, 10 g of powdered 2,5-dihydroxy-3-t-butylbenzene was added portionwise over a period of about 10 minutes. The reaction mixture was stirred an additional 3 hours at 75° C, and then poured into 3 l of dichloromethane while stirring with an agitator. The resulting precipitate was dissolved in 300 ml of a 0.5 N aqueous potassium carbonate solution, and the solution obtained was charged in a tube of a dialysis membrane, and dialyzed for about 40 minutes against running water. The resulting solution was dried in a freeze drier to obtain 30.6 g of product.

|          | Elemental Analysis |      |      |
|----------|--------------------|------|------|
|          | C                  | H    | N    |
| Found (%)| 53.0               | 5.88 | 6.27 |

The product had a limiting viscosity, as determined in a 1% aqueous sodium chloride solution at 30° C, or 0.16.

EXAMPLE 7

Preparation of Compound 15

To a 1 l three-necked flask equipped with a stirrer, a thermometer, a gas-delivery tube and a dropping-funnel, and placed on a steam bath, were added 20 g of 2,5-dihydroxybenzylamine and 350 ml of N,N-dimethylformamide, and the materials dissolved. Nitrogen gas was passed through the reactor to replace the air, and the temperature was increased to 80° C. A solution of 21.15 g of copoly(isobutylene-maleic anhydride) (molar ratio 32 1:1) in 210 ml of N,N-dimethylformamide was added dropwise over a period of about 10 minutes. The reaction solution was stirred an additional 2.5 hours, and then poured into 2 l of ethyl acetate while stirring with an agitator. After stirring about 30 minutes, the mixture was allowed to stand to precipitate the solid contents, and the solvent was removed by decantation. The resulting precipitate was dissolved in 500 ml of a 0.5 N aqueous sodium carbonate solution, and the solution was charged in a tube of a dialysis membrane, and dialyzed for about 30 minutes against running water. The resulting mixture was dried in a freeze drier to obtain 37.9 g of the product.

|          | Elemental Analysis |      |      |
|----------|--------------------|------|------|
|          | C                  | H    | N    |
| Found (%)| 55.51              | 5.62 | 3.87 |

The product had a limiting viscosity, as determined in a 1% aqueous sodium chloride solution at 30° C, of 0.18.

EXAMPLE 8

Preparation of Compound 17

To a 300 ml three-necked flask equipped with a stirrer, a thermometer, a gas-delivery tube and a dropping-funnel, and placed on a steam bath, were added 6.76 g of 2,5-dihydroxybenzylamine and 50 ml of N,N-dimethylformamide, and the materials dissolved. Nitrogen gas was passed through the reactor to replace the air and the temperature was increased to 70° C. A solution of 10 g of copoly(styrene-citraconic anhydride) (molar ratio = 1:1) in 50 ml of tetrahydrofuran was added dropwise over a period of about 10 minutes. The reaction mixture was stirred an additional 2 hours at 70° C, and poured into 600 ml of dichloromethane while stirring with an agitator. The resulting precipitate was dissolved in 150 ml of a 0.4 N aqueous sodium hydroxide solution, and the solution was charged in a tube of a dialysis membrane, dialyzed for about 25 hours against running water, and then freeze-dried. The yield of the product was 16.5 g.

|          | Elemental Analysis |      |      |
|----------|--------------------|------|------|
|          | C                  | H    | N    |
| Found (%)| 63.5               | 5.27 | 3.53 |

The product had a limiting viscosity, as determined in a 1% aqueous sodium chloride solution at 30° C, of 0.13. Use of copoly(styrene-phenyl maleic anhydride) also provides similar excellent results to copoly(styrene-citraconic anhydride) used above.

EXAMPLE 9

Preparation of Compound 18

To a 1 l three-necked flask equipped with a stirrer, a thermometer and a gas-delivery tube, and placed on a steam bath, were added 9.8 g of poly(maleic anhydride), 11 g of 2,5-dihydroxybenzylamine hydrobromide, 12.85 g of 2-(p-methylaminophenethyl)-6-methylhydroquinone and 400 ml of N,N-dimethylformamide, and the materials dissolved. After the temperature was increased to 80° C, 0.1 g of sodium hydrosulfite and 2.65 g of sodium carbonate was added over a period of about 5 minutes with the addtion of 10 ml of distilled water. The reaction mixture was stirred an additional 3 hours at 80° C, and poured into 2 l of dichloromethane while stirring with an agitator. The resulting precipitate was dissolved in 400 ml of a 1N aqueous sodium carbonate solution, and the solution obtained was dialyzed for 40 hours against running water, and freeze-dried to obtain 25 g of a brown powder.

|  | Elemental Analysis | | |
|---|---|---|---|
|  | C | H | N |
| Found (%) | 55.3 | 4.33 | 3.91 |

The product had a limiting viscosity, as determined in a 1% aqueous sodium chloride solution at 30° C, of 0.08.

EXAMPLE 10

Preparation of Compound 19

To a 1 l three-necked flask equipped with a stirrer, a thermometer, a gas-delivery tube and a dropping-funnel, and placed on a steam bath, were placed 35 g of p-aminophenethylhydroquinone and 300 ml of N,N-dimethylformamide, and the materials dissolved. Nitrogen gas was passed through the reactor to displace the air, and the temperature was increased to 75° C. A solution of 28.1 g of copoly(vinyl chloride-maleic anhydride) (molar ratio = 1:1) in 300 ml of N,N-dimethylformamide was added dropwise over a period of about 20 minutes. The reaction solution was stirred an additional 2 hours at 75° C, and poured into 25 l of dichloromethane with stirring. The resulting precipitate was dissolved in 500 ml of a 0.5 N aqueous sodium carbonate solution, and stirred for 1 hour at 50° C. The solution was charged in a cellophane tube, dialyzed for about 30 hours against running water, and dried in a freeze-drier to obtain 61 g of brown powder.

|  | Elemental Analysis | | |
|---|---|---|---|
|  | C | H | N |
| Calculated (%) | 60.69 | 5.06 | 3.22 |
| Found (%) | 60.57 | 5.31 | 3.20 |

The product had a limiting viscosity, as determined in a 1% aqueous sodium chloride solution at 30° C, of 0.64.

EXAMPLE 11

Preparation of Compound 20

To a 2 l three-necked flask equipped with a stirrer, a thermometer, gas-delivery tube and a dropping-funnel, and placed on a steam bath, were added 30 g of 2,5-dihydroxybenzylamine and 600 ml of N,N-dimethylformamide, and the materials dissolved. Nitrogen gas was passed through the reactor to displace the air, and the temperature was increased to 70° C. A solution of 126 g of copoly(vinyl acetate-maleic anhydride) (molar ratio = 1:1) in 600 ml of tetrahydrofuran and 80 ml of N,N-dimethylformamide was added dropwise over a period of 20 minutes. Immediately after the beginning of the addition, 70 g of 2,5-dihydroxybenzylamine was added dropwise over a period of 15 minutes. The reaction solution was stirred on additional 3.5 hours, and poured into 4 l of dichloromethane to reprecipitate the product while stirring with an agitator. After stirring 30 minutes, the resulting mixture was allowed to stand, and the solvent was removed by decantation. 3 l of dichloromethane was poured quickly onto the precipitate, and the resulting mixture was stirred for 1 hour. The precipitate was filtered by suction, washed with three 300 ml portions of dichloromethane, and immediately freeze-dried to obtain 218 g of light brown powder.

|  | Elemental Analysis | | |
|---|---|---|---|
|  | C | H | N |
| Calculated (%) | 55.83 | 5.29 | 4.46 |
| Found (%) | 55.71 | 5.33 | 4.39 |

The product had a limiting viscosity, as determined in a 1% aqueous sodium chloride solution at 30° C, of 0.27.

EXAMPLE 12

Preparation of Compound 21

In a 1 l three necked flask were placed 100 g of powdered copoly(acrylamide-maleic anhydride) (molar ratio = 1:1) and 73.34 g of 2,5-dihydroxybenzylamine. The reactor was then equipped with a stirrer, a thermometer and a gas-delivery tube and placed on a steam bath. To this reactor were added 500 ml of N,N-dimethylformamide, and the materials dispersed. Nitrogen gas was passed through the reactor to displace the air, and 150 ml of distilled water was added to dissolve the mixture. After stirring for 3 hours, the reaction solution was cooled to 35° C, and 70 ml of acetone was poured therein with stirring. The resulting solution was poured into 2.5 l of acetone with vigorous stirring, and the precipitate was separated by decantation. 2 l of acetone was poured onto the precipitate, and the resulting mixture was stirred vigorously for 1 hour. The precipitate was filtered by suction, and vacuum dried to obtain 152.4 g of brown powder.

|  | Elemental Analysis | | |
|---|---|---|---|
|  | C | H | N |
| Found (%) | 55.60 | 5.56 | 9.82 |

The product had a limiting viscosity, as determined in a 1% aqueous sodium chloride solution at 30° C, of 0.14.

EXAMPLE 13

Preparation of Compound 22

To a 1 l three-necked flask equipped with a stirrer, a thermometer and a gas-delivery tube, and placed on a steam bath, were added 8.5 g of copoly(maleic anhydride-methyl vinyl ether) (molar ratio = 1:1), 13.5 g of 2-(2-aminopropyl)hydroquinone hydrobromide and 400 ml of N,N-dimethylformamide, and the materials dissolved. After the solution was heated to 65° C, 5.8 g of sodium hydrogen carbonate was added portionwise over a period of about 10 minutes, and 10 ml of distilled water was added thereinto at the same time. After stirring an additional 4 hours at 60° C, the reaction solution was poured into 1.5 l of dichloromethane while stirring with an agitator. The resulting precipitate was dissolved in 150 ml of distilled water, and the solution was charged in a cellulose tube (semi-permeable membrane), dialyzed for about 30 hours against running water, and freeze-dried to obtain 15.8 g of a reddish brown powder.

| | Elemental Analysis | | |
|---|---|---|---|
| | C | H | N |
| Found (%) | 46.76 | 5.75 | 3.97 |

The product had a limiting viscosity, as determined in a 1% aqueous sodium chloride solution at 30° C, of 0.49.

EXAMPLE 14

Preparation of Compound 23

To a 2 l three-necked flask equipped with a stirrer, a thermometer and a gas-delivery tube, and placed on a steam bath, were added 70.65 g of 2-(3-aminopropyl)hydroquinone hydrobromide, 52.42 g of copoly(vinyl acetate-maleic anhydride) (molar ratio = 1:1) and 700 ml of N,N-dimethylformamide, and the materials dissolved. After the solution was heated to 75° C, 23.9 g of sodium hydrogen carbonate was added portionwise over a period of about 15 minutes, and 50 ml of distilled water was poured thereinto at the same time. After stirring an additional 3 hours at 75° C, the reaction solution was poured into 3 l of dichloromethane while stirring with an agitator. The resulting precipitate was dissolved in 1000 ml of distilled water, charged in a cellulose tube, dialyzed for 40 hours against running water, and freeze-dried to obtain 90.3 g of a brown powder.

| | Elemental Analysis | | |
|---|---|---|---|
| | C | H | N |
| Found (%) | 54.71 | 3.84 | 3.59 |

The product had a limiting viscosity, as determined in a 1% aqueous sodium chloride solution at 30° C, of 0.36.

While the invention has been described in detail and with reference to specific embodiments thereof, it will be apparent to one skilled in the art that various changes and modifications can be made therein without departing from the spirit and scope thereof.

What is claimed is:

1. A water soluble homopolymer or copolymer containing in its main chain recurring units of the formula (I):

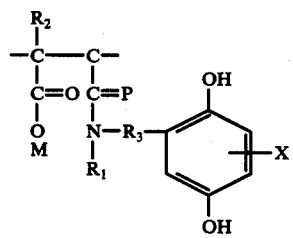

or the formula (II):

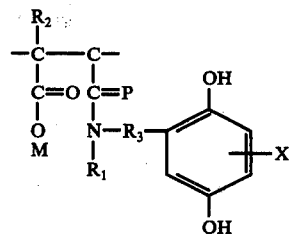

wherein X represents a hydrogen atom, a halogen atom, an alkyl group, an allyl group or an aryl group; $R_1$ represents a hydrogen atom or an alkyl group; $R_2$ represents a hydrogen atom, an alkyl group or an aryl group; $R_3$ represents a divalent group selected from the group consisting of a straight chain alkylene group having 1 to 8 carbon atoms; a branched chain alkylene group having 1 to 8 carbon atoms; an arylene group and a group having the formula:

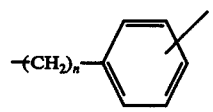

wherein $n$ is an integer of 1 to 4; and M is selected from the group consisting of a hydrogen atom, an alkali metal atom and a quaternary ammonium group.

2. The polymer as claimed in claim 1, wherein X and $R_1$ each represents a hydrogen atom or an alkyl group having from 1 to 8 carbon atoms.

3. The polymer as claimed in claim 1, wherein X and $R_1$ each represents an alkyl group having from 1 to 4 carbon atoms.

4. The polymer as claimed in claim 1, wherein X represents a chlorine atom or a bromine atom.

5. The polymer as claimed in claim 1, wherein X represents a hydrogen atom.

6. The polymer as claimed in claim 1, wherein $R_3$ represents an alkylene group having from 1 to 8 carbon atoms.

7. The polymer as claimed in claim 6, wherein $R_3$ represents an alkylene group having from 1 to 3 carbon atoms.

8. The polymer of claim 1, prepared from maleic anhydride, citraconic anhydride or phenyl maleic anhydride.

9. A process for producing the water-soluble polymers as claimed in claim 1, comprising reacting a hydroquinone compound of the formula (III)

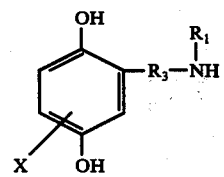

wherein X represents a hydrogen atom, a halogen atom, an alkyl group or an aryl group; $R_1$ represents a hydrogen atom or an alkyl group; and $R_3$ represents a divalent group selected from the group consisting of a straight chain alkylene group having 1 to 8 carbon atoms; a branched chain alkylene group having 1 to 8 carbon atoms; an arylene group and a group having the formula:

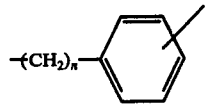

wherein $n$ is an integer of 1 to 4 or a salt thereof; with a homopolymer or copolymer containing in its main chain the recurring units of the formula (IV):

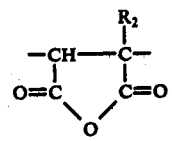

10. The process of claim 9, wherein said polymer having recurring units of the formula (IV) is prepared from maleic anhydride, citraconic anhydride or phenyl maleic anhydride.

UNITED STATES PATENT OFFICE
CERTIFICATE OF CORRECTION

Patent No. 4,065,435              Dated December 27, 1977

Inventor(s) SHINJI SAKAGUCHI

It is certified that error appears in the above-identified patent and that said Letters Patent are hereby corrected as shown below:

Claim 1, delete formula (I) and formula (II) and insert therefor:

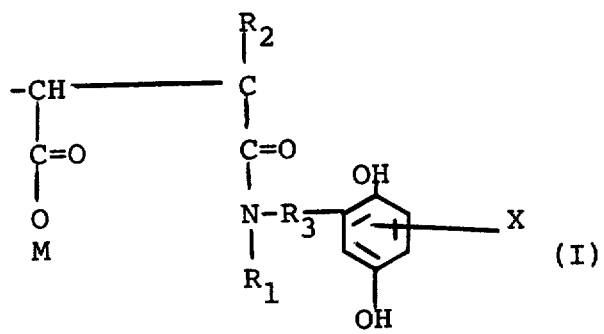

UNITED STATES PATENT OFFICE
CERTIFICATE OF CORRECTION

Patent No. 4,065,435　　　　　　　Dated　December 27, 1977

Inventor(s)　SHINJI SAKAGUCHI

It is certified that error appears in the above-identified patent and that said Letters Patent are hereby corrected as shown below:

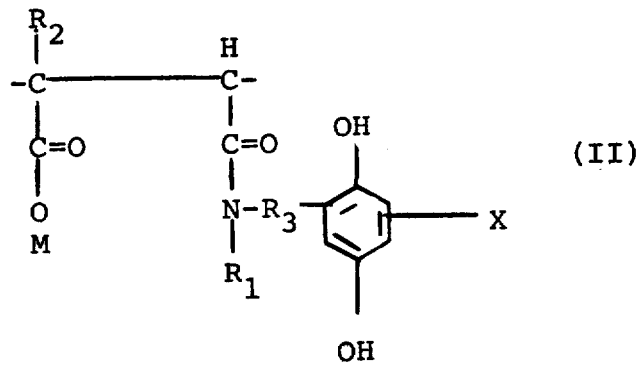

(II)

[SEAL]

Attest:

Signed and Sealed this

Twelfth Day of December 1978

RUTH C. MASON
*Attesting Officer*

DONALD W. BANNER
*Commissioner of Patents and Trademarks*